United States Patent
Yee et al.

(10) Patent No.: US 9,112,870 B1
(45) Date of Patent: Aug. 18, 2015

(54) PROCESSING DEVICE HAVING SESSION COMPONENT WITH INTEGRATED SUPPORT FOR MESSAGE QUEUING PROTOCOL

(75) Inventors: YinKee Yee, Newark, CA (US); Sergey A. Razin, Columbia, SC (US); Yicang Wu, Shanghai (CN); Kai Chen, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 182 days.

(21) Appl. No.: 13/432,543

(22) Filed: Mar. 28, 2012

(51) Int. Cl.
*G06F 15/16* (2006.01)
*H04L 29/06* (2006.01)
*H04L 12/58* (2006.01)

(52) U.S. Cl.
CPC ............. *H04L 65/1003* (2013.01); *H04L 51/06* (2013.01)

(58) Field of Classification Search
CPC . H04L 65/10; H04L 65/1003; H04L 65/1006; H04L 65/1046; H04L 12/5835; H04L 12/58; H04L 12/581; H04L 12/5855; H04L 63/0815; H04L 63/20; H04L 67/14
USPC .................. 709/203, 204, 205, 206, 207, 208
See application file for complete search history.

(56) References Cited

U.S. PATENT DOCUMENTS

| | | | |
|---|---|---|---|
| 2005/0210113 A1* | 9/2005 | Kasuga et al. ................. | 709/206 |
| 2008/0098297 A1* | 4/2008 | Sun et al. ...................... | 715/234 |
| 2011/0145320 A1* | 6/2011 | Megginson .................... | 709/203 |
| 2011/0252100 A1* | 10/2011 | Raciborski et al. ........... | 709/206 |
| 2011/0307443 A1 | 12/2011 | Megginson | |
| 2011/0307543 A1 | 12/2011 | Megginson | |
| 2012/0117125 A1* | 5/2012 | Hung ............................ | 707/803 |
| 2012/0233315 A1* | 9/2012 | Hoffman et al. .............. | 709/224 |

OTHER PUBLICATIONS

CIM Schema, Version 2.29.0, May 3, 2011, 3922 pages.
Distributed Management Task Force, Inc. (DMTF), "Common Information Model (CIM) Infrastructure," Document No. DSP0004, Version 2.6.0, Mar. 2010, 186 pages.
J. Rosenberg et al., "SIP: Session Initiation Protocol," Internet Engineering Task Force (IETF), Request for Comments: 3261, Jun. 2002, 269 pages.
U.S. Appl. No. 13/170,345, filed Jun. 28, 2011, in the name of Juels et al. and entitled "Service Window Optimized System Alert Engine."

\* cited by examiner

*Primary Examiner* — Dhairya A Patel
(74) *Attorney, Agent, or Firm* — Ryan, Mason & Lewis, LLP

(57) ABSTRACT

Session information is received in a processing device and processed to generate a message in a message queuing protocol format. The resulting message is provided to a message queuing protocol server. The session information may comprise at least a portion of a session initiation protocol (SIP) message, and may be received in a SIP component, which may comprise a SIP endpoint. In processing the session information to generate the message in the message queuing protocol format, at least a portion of the session information may be incorporated into an advanced message queuing protocol (AMQP) message that is transmitted to an AMQP server. The SIP component may comprise a user agent coupled to an AMQP message listener and an AMQP message sender. The SIP component may also receive an AMQP message from the AMQP server, process the message to generate session information, and provide the session information to a user device.

20 Claims, 6 Drawing Sheets

PROCESSING DEVICE HAVING SESSION COMPONENT WITH INTEGRATED SUPPORT FOR MESSAGE QUEUING PROTOCOL

FIELD

Illustrative embodiments of the invention relate generally to messaging between elements of information technology infrastructure.

BACKGROUND

Information technology infrastructure elements such as computers and mobile telephones may be configured to establish communication sessions with one another in accordance with the Session Initiation Protocol (SIP), described in Internet Engineering Task Force (IETF) Request for Comments (RFC) 3261, "SIP: Session Initiation Protocol," June 2002, which is incorporated by reference herein. SIP is an application-layer signaling protocol used for establishing communication sessions in an Internet Protocol (IP) network. It can be used to create, modify and terminate sessions, which may include, for example, IP telephone calls or collaborative multimedia conferences. These sessions make possible a wide array of innovative services, such as voice-enriched e-commerce, web page click-to-dial, instant messaging with buddy lists, and IP-PBX telephony services.

A session may be considered an exchange of data between a group of two or more participants, also referred to as users. The users are associated with endpoints that are referred to as user agents. SIP allows user agents to discover one another and to agree on a characterization of a session they would like to share. Sessions are created using SIP invite messages that carry session descriptions that allow the users to agree on a set of compatible media types. SIP also enables the creation of an infrastructure of network hosts, called proxy servers, to which user agents can send invite messages and other other requests. For example, SIP provides a registration function that allows users to upload their current locations for use by proxy servers. SIP works independently of underlying transport protocols and without dependency on the type of session that is being established.

One drawback of SIP and other similar messaging protocols is that internal implementations of proxy servers within infrastructure products may utilize proprietary queuing mechanisms. Thus, infrastructure product vendors may provide implementations of SIP in a variety of different forms. This can create difficulties for product customers that attempt to integrate their own third-party applications with one or more of the vendor-specific SIP implementations.

Accordingly, integration of products that include vendor-specific SIP implementations is particularly challenging under conventional practice, and can lead to excessive product integration costs. The situation is further complicated by the fact that an increasing number of enterprises are migrating portions of their information technology infrastructure to cloud service providers.

SUMMARY

Illustrative embodiments of the invention provide techniques for configuring a SIP component or other type of session component of a processing device with integrated support for messaging in a designated message queuing protocol format, such as an advanced message queuing protocol (AMQP) format. An arrangement of this type allows a wide variety of infrastructure products to be seamlessly integrated with any third-party vendor applications that use AMQP as middleware.

In one embodiment, session information is received in a processing device and processed to generate a message in a message queuing protocol format. The resulting message is provided to a message queuing protocol server. The session information may comprise at least a portion of a SIP message, and may be received in a SIP component, which may illustratively comprise a SIP endpoint.

By way of example, in processing the session information to generate the message in the message queuing protocol format, at least a portion of the session information may be incorporated into an AMQP message that is transmitted to an AMQP server. The SIP component may comprise a user agent coupled to an AMQP message listener and an AMQP message sender. The SIP component may also receive an AMQP message from the AMQP server, process the received message to generate session information, and provide the session information to a user device.

One or more of the illustrative embodiments overcome the above-noted drawbacks of conventional practice. For example, providing a SIP component with integrated support for a message queuing protocol such as AMQP facilitates integration of products that include vendor-specific SIP implementations, thereby significantly reducing product integration costs. The disclosed techniques are suitable for implementation in a wide variety of different types of information technology infrastructure, including virtual infrastructure of a cloud service provider.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
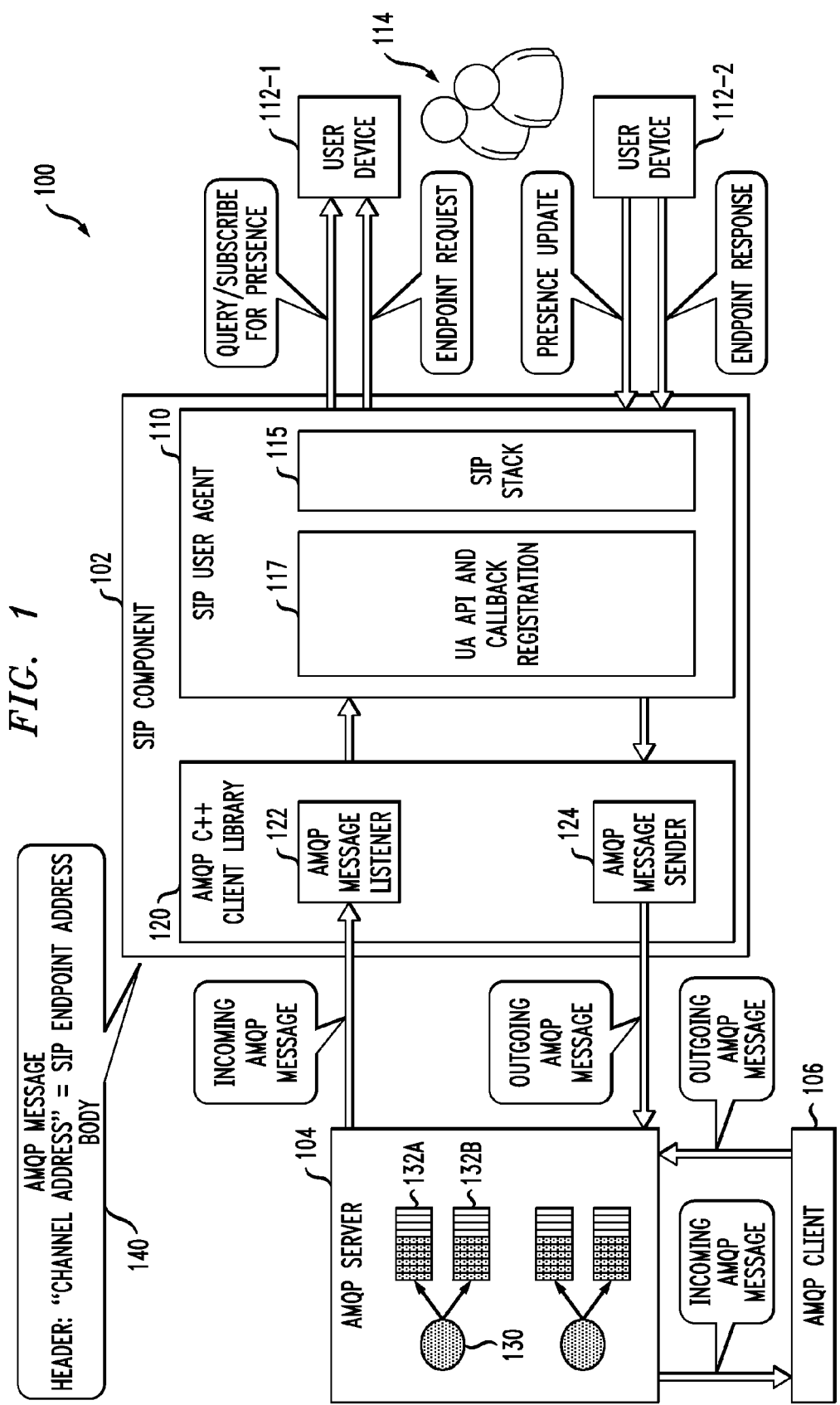
FIG. 1 is a block diagram of an information processing system that includes a SIP component with integrated support for AMQP messaging in an illustrative embodiment of the invention.

FIG. 1 shows an information processing system 100 that includes a SIP component 102 configured with integrated support for AMQP messaging in an illustrative embodiment of the invention. The SIP component 102 is coupled to an AMQP server 104 which communicates with an AMQP client 106. The SIP component 102 includes a SIP user agent 110 configured for interfacing with user devices 112-1 and 112-2 associated with respective users 114.

The SIP component 102 is generally configured to receive session information from one or more of the user devices 112, to process the received session information to generate a message in a designated message queuing protocol format, which is illustratively an AMQP format, and to provide the message to the AMQP server 104. The session information comprises at least a portion of a SIP message, as defined in the above-cited RFC 3261. The SIP component 102 is further configured to receive a message from the AMQP server 104, to process the received message to generate session information, and to provide the session information to one or more of the user devices 112.

The SIP component 102 may illustratively comprise a SIP endpoint of the type disclosed in RFC 3261. Although shown as separate from each of the user devices 112 in the FIG. 1 embodiment, in other embodiments the SIP component may be at least partially integrated within a given user device.

The session information in the case of SIP messages may illustratively comprise presence information, instant messaging text information, and other types of session information. However, the term "session information" as used herein is intended to be broadly construed, and is not limited only to SIP information.

The AMQP server 104 operates in accordance with the AMQP Specifications, Version 1.0, including one or more of Broker Behaviour Definition, Addressing Specification, Broker Management, JMS Mapping, WCF Mapping, Compatibility, and Distributed Transactions specifications, which are incorporated by reference herein. As indicated previously, other embodiments may utilize message queuing protocols other than AMQP. AMQP is a messaging protocol in which entities referred to as producers generate messages and entities referred to as consumers receive and process the messages.

The system 100 is configured to integrate AMQP and SIP functionality in a manner that allows SIP component 102 to publish and consume AMQP messages while also exchanging associated session information with user devices 112.

The SIP user agent 110 of SIP component 102 comprises a SIP stack 115 adapted for processing communications with the user devices 112 and an application programming interface (API) component 117 through which the SIP user agent communicates with a client library component 120. The API component 117 in the present embodiment is more particularly implemented as an API and callback registration component configured to interface with an AMQP C++ client library, although other types of API and client library components 117 and 120 may be used in other embodiments. The client library component implements an AMQP message listener 122 and an AMQP message sender 124, both of which are coupled to the SIP user agent 110 via its API component 117. The AMQP listener 122 and sender 124 are adapted for communication with the AMQP server 104.

The AMQP server 104 illustratively comprises a plurality of exchanges 130 coupled to respective sets of queues 132A and 132B.

Session information is exchanged between the SIP user agent 110 and the user devices 112 as indicated in the figure. For example, the SIP component 112 may send endpoint requests to the user devices and receive endpoint responses from those devices. Such requests and responses may illustratively comprise queries or subscription requests for presence information sent to the endpoint devices and corresponding presence updates received in response from the user devices.

The SIP component 102 incorporates information received in one or more incoming AMQP messages from the AMQP server 104 via message listener 122 into requests or other outgoing session information that is sent to the user devices 112 via the SIP user agent 110. Also, the SIP component 102 incorporates incoming session information from the user devices 112 into one or more AMQP messages that are transmitted via message sender 124 to the AMQP server 104. The incoming AMQP messages provided by the AMQP server 104 to the SIP component 102 via message listener 122 may be messages from AMQP client 106, and the outgoing AMQP messages sent by the AMQP server 104 to the AMQP client 106 may be messages that are provided to the AMQP server by the message sender 124 of the SIP component 102. AMQP messages received in the AMQP server 104 from the AMQP client 106 or from the SIP component 102 are stored in selected ones of the queues 132 under one or more of the exchanges 130.

An exemplary AMQP message format in the FIG. 1 system is indicated by reference numeral 140. In this example, a given incoming AMQP message directed from the AMQP server 104 to the SIP component 102 includes a header and a body, with the header more particularly identifying as a channel address the address of a particular SIP endpoint, in this case the SIP component 102.

The SIP component 102 may be implemented using at least one processing device. A given processing device utilized to implement at least a portion of SIP component 102 may be implemented in information technology (IT) infrastructure of a service provider or other enterprise. As a more particular example, the processing device may be implemented at least in part within virtual infrastructure of a cloud service provider. It may comprise a computer, server, mobile telephone or other type of processing device. Examples of IT infrastructure suitable for implementing the SIP component 102 and other portions of the information processing system 100 will be described below in conjunction with FIGS. 3 and 4. Such IT infrastructure may comprise one or more processing platforms in which processing devices are configured to communicate with one another over a network.

Each such processing device generally comprises at least one processor and an associated memory, and implements one or more functional modules for controlling certain features of the information processing system 100. Multiple system elements may be implemented by a single processing device in a given embodiment. For example, one or more of the AMQP server 104, AMQP client 106, and user devices 112 may also be implemented at least in part on the same processing device used to implement SIP component 102. Alternatively, separate processing devices may be used to implement each of these system elements. The term "information technology infrastructure" as used herein is intended to be broadly construed so as to encompass these and numerous other arrangements of one or more processing devices. AMQP client 106, and user devices 112 may also be implemented at least in part on the same processing device used to implement SIP component 102. Alternatively, separate processing devices may be used to implement each of these system elements. The term "information technology infrastructure" as used herein is intended to be broadly construed so as encompass these and numerous other arrangements of one or more processing devices.

It should be noted that the particular set of elements shown in FIG. 1 for providing a SIP component with integrated support for AMQP is presented by way of example, and in other embodiments additional or alternative elements may be used. Thus, another embodiment may include additional instances of one or more of elements 102, 104, 106, 110, 112, 115, 117 and 120. Also, one or more of these or other system elements may be implemented at least in part in the form of software. Such software is stored and executed utilizing respective memory and processor elements of at least one processing device.

In addition, numerous other arrangements of computers, servers, storage devices or other components are possible in the information processing system 100. Such components can communicate with other elements of the information processing system 100 over any type of network, such as a wide area network (WAN), a local area network (LAN), a satellite network, a telephone or cable network, or various portions or combinations of these and other types of networks.

Moreover, the functionalities associated with separate elements in the FIG. 1 embodiment may be combined into a lesser number of elements each of which performs multiple functions. Thus, at least a subset of the elements may be collectively implemented on a common processing platform, or each such element may be implemented on a separate processing platform comprising one or more servers, computers or other processing devices.

The operation of the information processing system 100 will now be described in greater detail with reference to the flow diagrams of FIGS. 2A and 2B, which illustrate the processing of outgoing and incoming AMQP messages in the system 100.

Figure 2A:
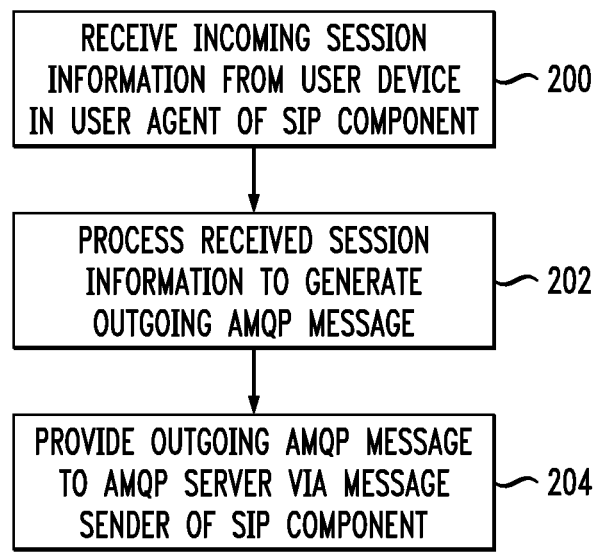
FIGS. 2A and 2B are flow diagrams illustrating processing operations associated with respective outgoing and incoming AMQP messages in the system of FIG. 1.

Referring initially to FIG. 2A, the process as shown includes steps 200, 202 and 204, which are assumed to be performed by the SIP component 102, although in other embodiments one or more such steps may be implemented at least in part by other system elements.

In step 200, incoming session information is received from at least one of the user devices 112 in the SIP user agent 110 of the SIP component 102. As noted above, such session information may comprise, for example, presence information, instant messaging text information or other types of session information conveyed to the SIP component 102 in one or more SIP messages received from the user devices 112.

In step 202, the received session information is processed in the SIP component 102 in order to generate an outgoing AMQP message. This processing involves interaction between the SIP user agent 110 and the client library component 120 via the API component 117.

In step 204, the outgoing AMQP message is provided to the AMQP server 104 via the AMQP message sender 124 implemented using the client library component 120 of the SIP component 102. The AMQP server 104 may in turn deliver the AMQP message to the AMQP client 106.

Figure 2B:
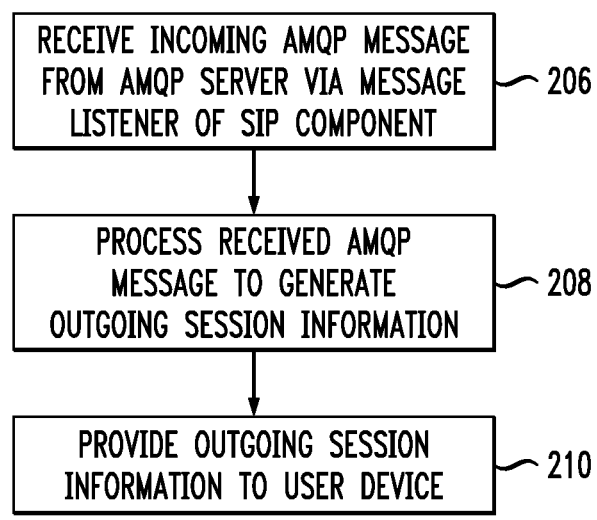

Referring now to FIG. 2B, the process as shown includes steps 206, 208 and 210, which are also assumed to be performed by the SIP component 102. Again, in other embodiments one or more such steps may be implemented at least in part by other system elements.

In step 206, an incoming AMQP message is received in the SIP component 102 from the AMQP server 104 via the AMQP message listener 122. The AMQP server 104 may have received the AMQP message from the AMQP client 106.

In step 208, the received AMQP message is processed to generate outgoing session information. This processing involves interaction between the client library component 120 and the SIP user agent 110 via the API component 117.

In step 210, the outgoing session information is provided to one or more of the user devices 112. For example, one or more SIP messages may be generated by the SIP user agent 110 that incorporate the outgoing session information, and delivered by the SIP user agent to one or more of the user devices 112 via the SIP stack 115.

The particular processing operations and other system functionality described in conjunction with the flow diagrams of FIGS. 2A and 2B are presented by way of illustrative example only, and should not be construed as limiting the scope of the invention in any way. Alternative embodiments can use other types of processing operations for processing incoming session information to generate outgoing AMQP messages and for processing incoming AMQP messages to generate outgoing session information. For example, the ordering of the process steps may be varied in other embodiments, or certain steps may be performed concurrently with one another rather than serially. Also, steps 200, 202 and 204 may be performed repeatedly for each of a series of incoming SIP messages, and steps 206, 208 and 210 may be performed repeatedly for each of a series of incoming AMQP messages. Additional or alternative process steps may be used in other embodiments.

It is also to be appreciated that message transformation functionality such as that described in conjunction with the flow diagrams of FIGS. 2A and 2B can be implemented at least in part in the form of one or more software programs stored in memory and executed by a processor of a processing device such as a computer or server. A memory or other storage device having such program code embodied therein is an example of what is more generally referred to herein as a "computer program product."

The embodiments described in conjunction with FIGS. 1 and 2 can provide a number of significant advantages relative to conventional practice. For example, such embodiments provide a SIP component in which AMQP and SIP functionality are integrated so as to allow the SIP component to process AMQP messages that incorporate session information associated with user devices. Providing a SIP component with integrated support for a message queuing protocol such as AMQP facilitates integration of products that include vendor-specific SIP implementations. As a result, such products can be seamlessly integrated with any third-party vendor applications that use AQMP as middleware, significantly reducing product integration costs.

Figure 3:
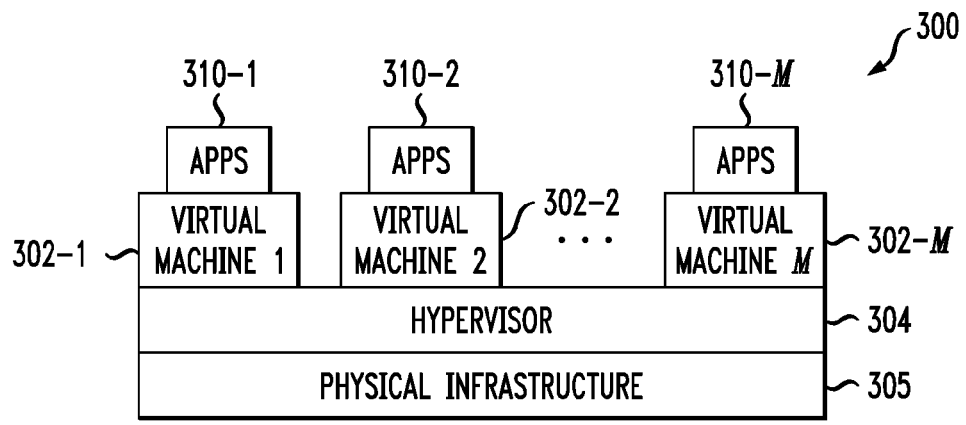
FIG. 3 shows one possible embodiment of cloud infrastructure that may be utilized to implement at least a portion of the FIG. 1 system.

Referring now to FIG. 3, portions of the IT infrastructure of information processing system 100 in this embodiment comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304. The cloud infrastructure 300 may be viewed as providing an example of what is more generally referred to herein as "virtual infrastructure." The cloud infrastructure 300 may encompass the entire system 100 or only portions of that system, such as the SIP component 102. Thus, for example, a given processing device utilized to implement at least a portion of SIP component 102 may comprise one or more of the virtual machines 302.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the IT infrastructure of information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the IT infrastructure of system 100.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the system 100 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an application-specific integrated circuit (ASIC), a field-programmable gate array (FPGA) or other type of processing circuitry, as well as portions or combinations of such circuitry elements, and the memory 412, which may be viewed as an example of a "computer program product" having executable computer program code embodied therein, may comprise random access memory (RAM), read-only memory (ROM) or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Figure 4:
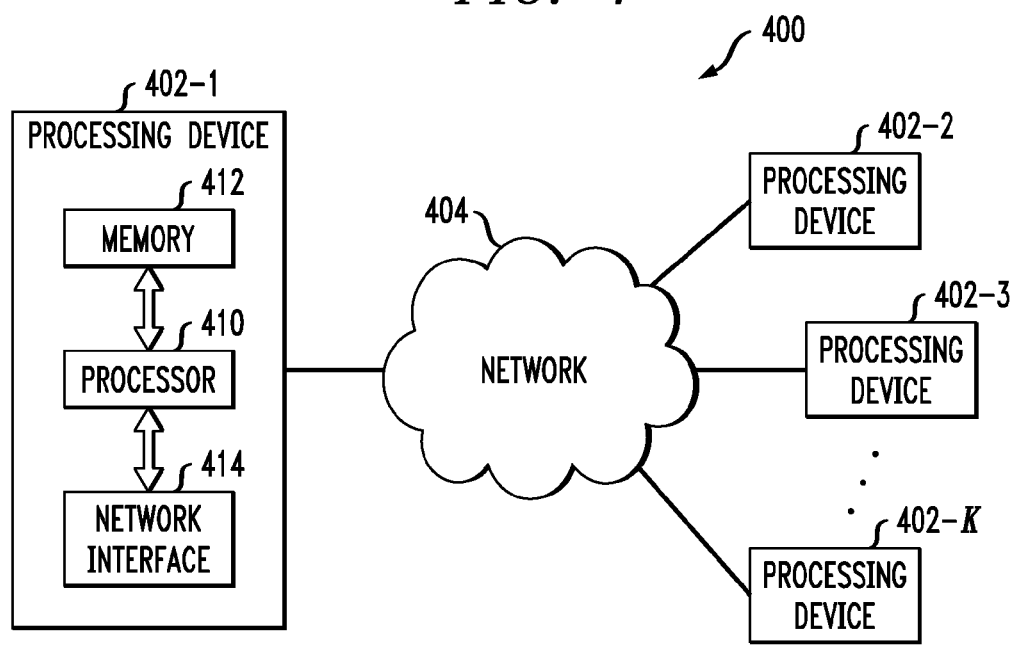
FIG. 4 shows one possible embodiment of a processing platform that may be utilized to implement at least a portion of the FIG. 1 system.

Multiple elements of information processing system 100 may be collectively implemented on a common processing platform of the type shown in FIG. 3 or 4, or each such element may be implemented on a separate processing platform.

In one possible use case of the information processing system 100 of FIG. 1, the AMQP client 106 in an illustrative embodiment may be associated with a service window optimized system alert (SWOSA) engine of the type described in U.S. patent application Ser. No. 13/170,345, filed Jun. 28, 2011, which is commonly assigned herewith and incorporated by reference herein.

A SWOSA engine in one implementation comprises an automating alerting framework which can provide highly accurate and efficient alerting for a wide variety of different monitored systems, including storage systems and other types of systems that are implemented using virtual infrastructure. It may be implemented using a plurality of modules, including, for example, a state monitor, a system configuration and history module, an alert generator, and an alert router. In such an arrangement, the state monitor is configured to send status data of the monitored system to the alert generator. The system configuration and history module provides information to the alert generator specifying an alert generation policy established for the monitored system. The alert generator is configured to process the status data from the state monitor in accordance with the alert generation policy specified by the system configuration and history module to generate at least one alert. The alert router is configured to determine optimal delivery characteristics for the generated alert and to deliver the alert in accordance with the optimal delivery characteristics.

The AMQP client 106 may be implemented in or coupled to a SWOSA engine of the type described above, so as to allow the SWOSA engine to communicate efficiently with user devices 112 using SIP. Other SWOSA configurations may be used in other embodiments. Also, the use of a SWOSA engine is just one example of a use case of the system 100, and a variety of other use cases will be described below in conjunction with FIGS. 5, 6 and 7.

Figure 5:
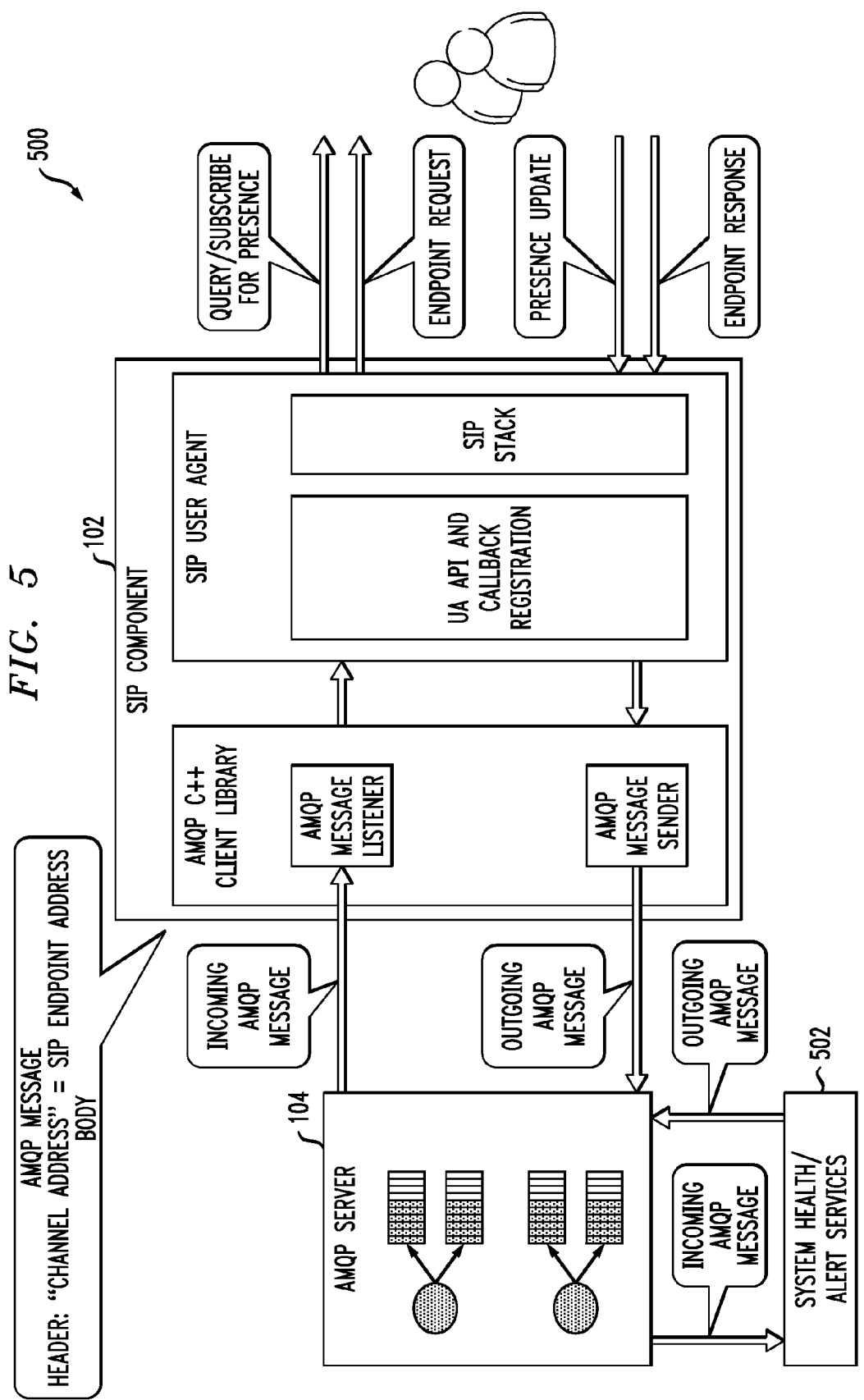
FIGS. 5 to 7 illustrate particular use cases of the SIP component and other portions of the FIG. 1 system.

FIG. 5 shows an information processing system 500 that incorporates SIP component 102 and AMQP server 104. The AMQP server 104 in this embodiment is coupled to a system health/alert services component 502, which exchanges AMQP messages with the AMQP server 104. These messages are processed by the SIP component in the manner described previously so as to facilitate use of session information by the system health/alert services component 502. This system health/alert services component may comprise at least a portion of a SWOSA engine of the type described above.

Figure 6:
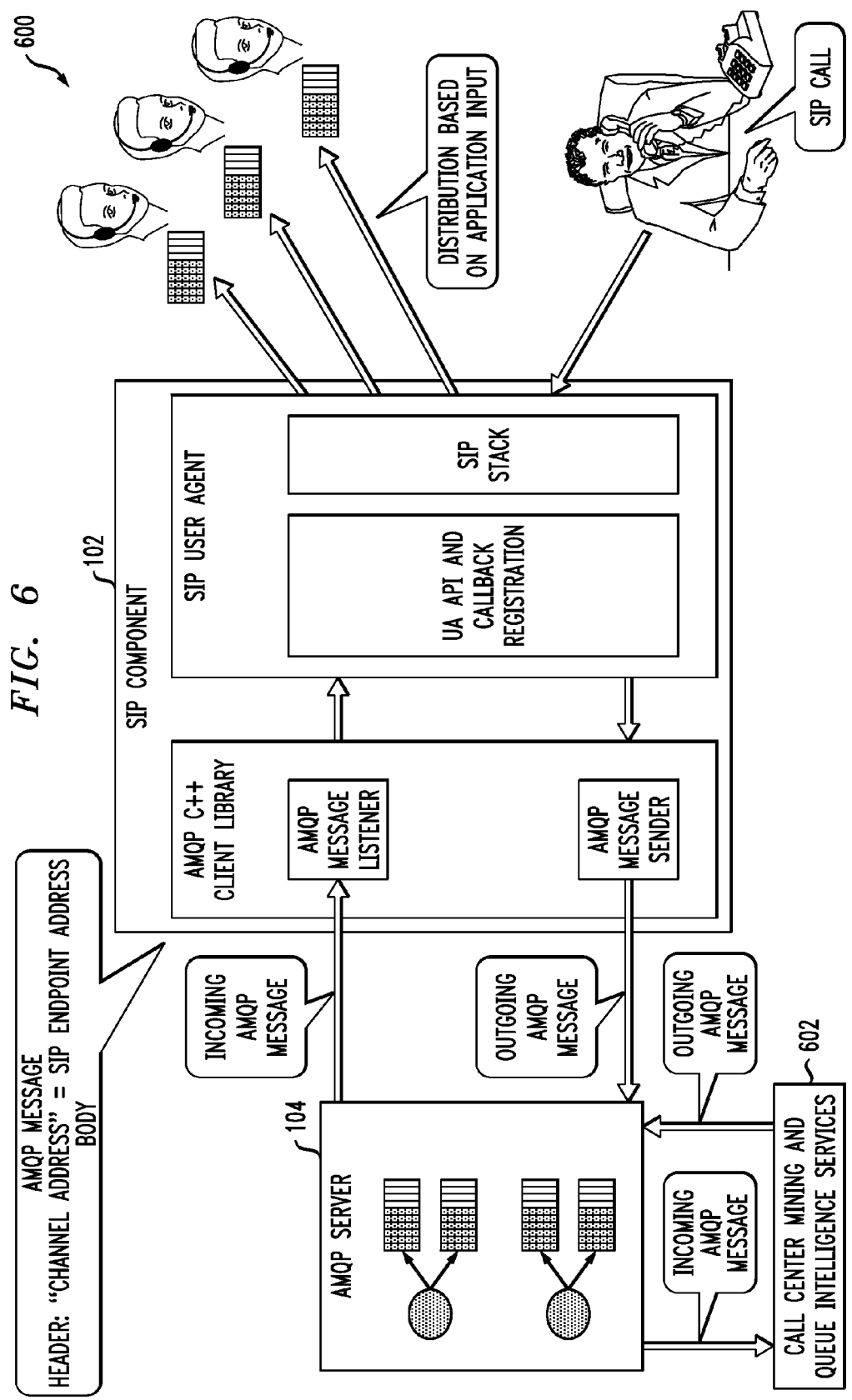

Another possible use case is shown in FIG. 6, in which information processing system 600 includes a call center mining and queue intelligence services component 602, as well as SIP component 102 and AMQP server 104. In this embodiment, the component 602 performs call center data mining at least in part by monitoring communications between SIP endpoints via AMQP message exchanges. One or more of the SIP endpoints may each be associated with respective call center queues, each corresponding to a call center service agent as shown. SIP calls and other communications from user devices are distributed to the call center queues for processing, based on application input from the call center mining and queue intelligence services component 602.

Figure 7:
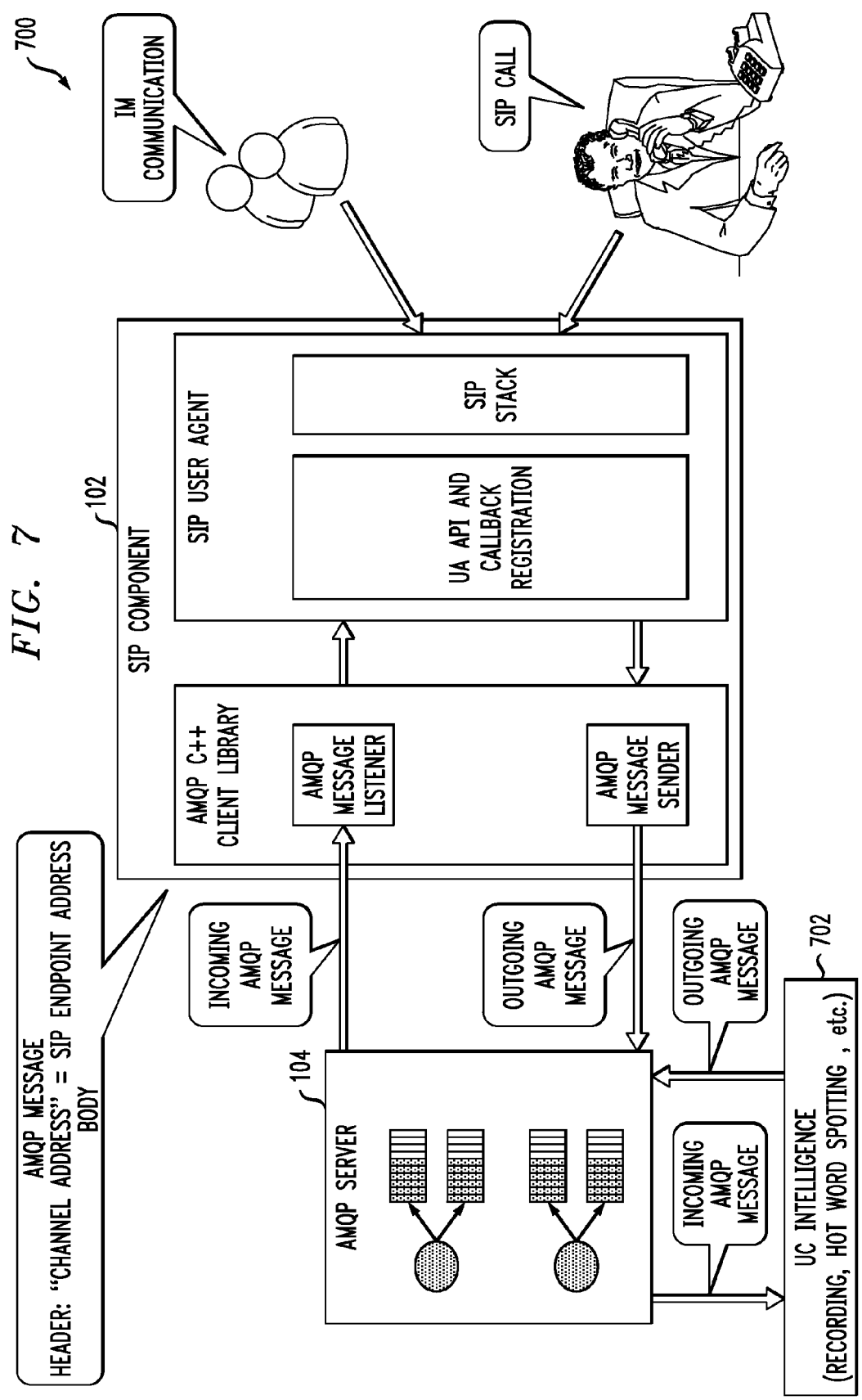

Yet another use case is shown in FIG. 7, in which information processing system 700 includes a unified communication (UC) intelligence component 702, as well as SIP component 102 and AMQP server 104. The UC intelligence component 702 performs operations such as recording, hot word spotting, etc. These operations are performed on SIP communications that illustratively include instant messaging communications and SIP calls.

In the use cases of FIGS. 5, 6 and 7, the operation of SIP component 102 and AMQP server 104 is generally as previously described in conjunction with FIGS. 1 and 2. The above-noted use cases are only examples, and the disclosed techniques can be applied in a wide variety of other information processing applications.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, IT infrastructure and processing device configurations, message queuing protocols, and messaging formats. The particular process steps and component interactions used to provide a session component with integrated support for a designated message queuing protocol may be varied in alternative embodiments. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
    receiving session information comprising at least a portion of a session initiation protocol (SIP) message;
    processing the received session information comprising at least a portion of the SIP message to generate a message in a designated message queuing protocol format; and
    providing the message in the designated message queuing protocol format to a message queuing protocol server;
    wherein the processing step comprises incorporating the session information comprising at least a portion of the SIP message into the message in the designated message queuing protocol format;
    wherein the receiving, processing and providing steps are performed in a SIP component implemented in a processing device of an information processing system, the SIP component comprising a user agent, a message queuing protocol message sender and a message queuing protocol message listener;
    wherein the processing step further comprises:
        receiving the session information in the user agent; and
        interacting with the message queuing protocol message sender via an application programming interface of the user agent;
    wherein the method further comprises the steps of:
        receiving an additional message in the designated message queuing protocol format from the message queuing protocol server; and
        processing the received additional message in the message queuing protocol message listener to generate additional session information; and
        providing the additional session information to a user device via the user agent; and
    wherein the message queuing protocol message listener is configured to interact with the user agent via the application programming interface of the user agent.

2. The method of claim 1 wherein said SIP message comprises at least one of presence information and messaging text information.

3. The method of claim 1 wherein the message in the designated message queuing protocol format comprises an advanced message queuing protocol (AMQP) message.

4. The method of claim 3 wherein the step of providing the message in the designated message queuing protocol format comprises transmitting the AMQP message to an AMQP server.

5. The method of claim 1 further comprising the step of providing the message in the designated message queuing protocol format from the message queuing protocol server to a message queuing protocol client.

6. The method of claim 1 wherein:
    the user agent comprises a SIP user agent configured for interfacing with the user device;
    the message queuing protocol message sender is coupled to the SIP user agent; and
    the message queuing protocol message listener is coupled to the SIP user agent.

7. The method of claim 6 wherein the SIP user agent is coupled to the message queuing protocol message sender and to the message queuing protocol message listener via the application programming interface.

8. A computer program product comprising a non-transitory processor-readable storage medium having encoded therein executable code of one or more software programs, wherein the one or more software programs when executed by a processing device cause the processing device to perform the steps of:
    receiving session information comprising at least a portion of a session initiation protocol (SIP) message;
    processing the received session information comprising at least a portion of the SIP message to generate a message in a designated message queuing protocol format; and
    providing the message in the designated message queuing protocol format to a message queuing protocol server;
    wherein the processing step comprises incorporating the session information comprising at least a portion of the SIP message into the message in the designated message queuing protocol format;
    wherein the receiving, processing and providing steps are performed in a SIP component implemented in a processing device of an information processing system, the SIP component comprising a user agent, a message queuing protocol message sender and a message queuing protocol message listener;
    wherein the processing step further comprises:
        receiving the session information in the user agent; and
        interacting with the message queuing protocol message sender via an application programming interface of the user agent;
    wherein the one or more software programs when executed by the processing device further cause the processing device to perform the steps of:
        receiving an additional message in the designated message queuing protocol format from the message queuing protocol server; and
        processing the received additional message in the message queuing protocol message listener to generate additional session information; and
        providing the additional session information to a user device via the user agent; and
    wherein the message queuing protocol message listener is configured to interact with the user agent via the application programming interface of the user agent.

9. The computer program product of claim 8 wherein said SIP message comprises at least one of presence information and messaging text information.

10. The computer program product of claim 8 wherein the message in the designated message queuing protocol format comprises an advanced message queuing protocol (AMQP) message.

11. The computer program product of claim 8 wherein the step of providing the message in the designated message queuing protocol format comprises transmitting the AMQP message to an AMQP server.

12. The computer program product of claim 8 wherein:
the user agent comprises a SIP user agent configured for interfacing with the user device;
the message queuing protocol message sender is coupled to the SIP user agent; and
the message queuing protocol message listener is coupled to the SIP user agent.

13. The computer program product of claim 12 wherein the SIP user agent is coupled to the message queuing protocol message sender and to the message queuing protocol message listener via the application programming interface.

14. An apparatus comprising:
at least one processing device comprising a processor coupled to a memory;
wherein the processing device is configured to receive session information comprising at least a portion of a session initiation protocol (SIP) message, to process the received session information comprising at least a portion of the SIP message to generate a message in a designated message queuing protocol format, and to provide the message in the designated message queuing protocol format to a message queuing protocol server;
wherein processing the received session information comprises incorporating the session information comprising at least a portion of the SIP message into the message in the designated message queuing protocol format;
wherein receiving the session information, processing the received session information and providing the message in the designated message queuing protocol format are performed in a SIP component implemented in the processing device;
the SIP component comprising a user agent, a message queuing protocol message sender and a message queuing protocol message listener;
wherein processing the received session information further comprises:
receiving the session information in the user agent; and
interacting with the message queuing protocol message sender via an application programming interface of the user agent;
wherein the processing device is further configured to receive an additional message in the designated message queuing protocol format from the message queuing protocol server, to process the received additional message in the message queuing protocol message listener in order to generate additional session information, and to provide the additional session information to a user device via the user agent; and
wherein the message queuing protocol message listener is configured to interact with the user agent via the application programming interface of the user agent.

15. The apparatus of claim 14 wherein:
the user agent comprises a SIP user agent configured for interfacing with the user device;
the message queuing protocol message sender is coupled to the SIP user agent; and
the message queuing protocol message listener is coupled to the SIP user agent.

16. The apparatus of claim 15 wherein the SIP user agent is coupled to the message queuing protocol message sender and to the message queuing protocol message listener via the application programming interface.

17. The apparatus of claim 15 wherein the message queuing protocol message sender and the message queuing protocol message listener are adapted for communication with the message queuing protocol server.

18. The apparatus of claim 14 wherein the processing device is implemented at least in part within virtual infrastructure of a cloud service provider.

19. The apparatus of claim 14 wherein the apparatus is implemented in an information processing system.

20. The information processing system of claim 19 wherein said at least one processing device is part of at least one processing platform comprising a plurality of processing devices with each such processing device of the processing platform comprising a processor coupled to a memory.

* * * * *